(12) United States Patent
Yang et al.

(10) Patent No.: US 8,564,897 B1
(45) Date of Patent: Oct. 22, 2013

(54) SYSTEMS AND METHODS FOR ENHANCED SYNC MARK DETECTION

(75) Inventors: Shaohua Yang, Santa Clara, CA (US);
Yoon L. Liow, San Ramon, CA (US);
Wu Chang, Santa Clara, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/529,572

(22) Filed: Jun. 21, 2012

(51) Int. Cl.
*G11B 5/09* (2006.01)

(52) U.S. Cl.
USPC ................... 360/39; 360/70; 360/55

(58) Field of Classification Search
None
See application file for complete search history.

(56) References Cited

U.S. PATENT DOCUMENTS

| | | |
|---|---|---|
| 4,777,544 A | 10/1988 | Brown |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,594,341 A | 1/1997 | Majidi-Ahy |
| 5,668,679 A | 9/1997 | Swearingen et al. |
| 5,696,639 A | 12/1997 | Spurbeck et al. |
| 5,768,044 A | 6/1998 | Hetzler |
| 5,781,129 A | 7/1998 | Schwartz et al. |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,892,632 A | 4/1999 | Behrens |
| 5,955,783 A | 9/1999 | Ben-Efraim |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silvestrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,269,058 B1 | 7/2001 | Yamanoi et al. |
| 6,278,591 B1 | 8/2001 | Chang |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,476,989 B1 | 11/2002 | Chainer |
| 6,490,110 B2 | 12/2002 | Reed et al. |
| 6,493,162 B1 | 12/2002 | Fredrickson |

(Continued)

FOREIGN PATENT DOCUMENTS

| | | |
|---|---|---|
| FR | 2904168 A1 | 1/2008 |
| WO | WO 03/047091 | 6/2003 |
| WO | WO 08/09620 | 1/2008 |

OTHER PUBLICATIONS

U.S. Appl. No. 13/529,572, filed Jun. 21, 2012, Yang et al.
Annampedu, V. et al fiAdaptive Algorithms for Asynchronous Detection of Coded Servo Signals Based on Interpolationfl, IEEE Transactions on Magnetics, vol. 41, No. 10, 10/05.

(Continued)

*Primary Examiner* — Muhammad N Edun
(74) *Attorney, Agent, or Firm* — Hamilton DeSanctis & Cha

(57) ABSTRACT

The present inventions are related to systems and methods for data processing, and more particularly to systems and methods for detecting patterns in a data stream.

20 Claims, 10 Drawing Sheets

(56) References Cited

U.S. PATENT DOCUMENTS

| | | |
|---|---|---|
| 6,519,102 B1 | 2/2003 | Smith et al. |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,671,404 B1 | 12/2003 | Kawatani |
| 6,717,764 B2 | 4/2004 | Lake |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,865,040 B2 | 3/2005 | Fayeulle et al. |
| 6,876,511 B2 | 4/2005 | Koyanagi |
| 6,906,990 B2 | 6/2005 | Nagata et al. |
| 6,912,099 B2 | 6/2005 | Annampedu et al. |
| 6,963,521 B2 | 11/2005 | Hayashi |
| 6,980,382 B2 | 12/2005 | Hirano et al. |
| 6,999,257 B2 | 2/2006 | Takeo |
| 6,999,264 B2 | 2/2006 | Ehrlich |
| 6,999,404 B2 | 2/2006 | Furumiya et al. |
| 7,002,767 B2 | 2/2006 | Annampedu et al. |
| 7,016,131 B2 | 3/2006 | Liu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,133,227 B2 | 11/2006 | Chiang et al. |
| 7,136,250 B1 | 11/2006 | Wu et al. |
| 7,154,689 B1 | 12/2006 | Shepherd et al. |
| 7,158,464 B2 | 1/2007 | Gushima et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,203,015 B2 | 4/2007 | Sakai et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,286,313 B2 | 10/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,394,608 B2 | 7/2008 | Eleftheriou et al. |
| 7,411,531 B2 | 8/2008 | Aziz et al. |
| 7,420,498 B2 | 9/2008 | Barrenscheen |
| 7,423,827 B2 | 9/2008 | Neville |
| 7,446,690 B2 | 11/2008 | Kao |
| 7,525,460 B1 | 4/2009 | Liu et al. |
| 7,529,320 B2 | 5/2009 | Byrne et al. |
| 7,558,177 B2 | 7/2009 | Ogura et al. |
| 7,602,567 B2 | 10/2009 | Park |
| 7,602,568 B1 | 10/2009 | Katchmart |
| 7,616,395 B2 | 11/2009 | Yamamoto |
| 7,620,101 B1 | 11/2009 | Jenkins |
| 7,630,155 B2 | 12/2009 | Maruyama et al. |
| 7,643,235 B2 | 1/2010 | Erden et al. |
| 7,656,982 B2 | 2/2010 | Gaedke et al. |
| 7,663,831 B2 | 2/2010 | Hayashi et al. |
| 7,679,850 B2 | 3/2010 | Smith |
| 7,693,243 B2 | 4/2010 | Chen et al. |
| 7,738,200 B2 | 6/2010 | Annampedu |
| 7,768,437 B2 | 8/2010 | Annampedu et al. |
| 7,768,730 B2 | 8/2010 | Bliss et al. |
| 7,796,480 B2 | 9/2010 | Cheng et al. |
| 7,813,065 B2 | 10/2010 | Annampedu |
| 7,821,730 B2 | 10/2010 | Cao |
| 7,835,104 B2 | 11/2010 | Yamashita et al. |
| 7,889,823 B2 | 2/2011 | Yang et al. |
| 7,929,237 B2 | 4/2011 | Grundvig et al. |
| 8,014,099 B2 | 9/2011 | Mathew et al. |
| 8,054,573 B2 | 11/2011 | Mathew et al. |
| 8,054,931 B2 | 11/2011 | Annampedu |
| 8,059,349 B2 | 11/2011 | Annampedu |
| 8,098,451 B2 | 1/2012 | Graef |
| 8,102,960 B2 | 1/2012 | Ran et al |
| 8,107,573 B2 | 1/2012 | Chang |
| 8,154,818 B2 | 4/2012 | Mathew et al. |
| 8,154,972 B2 | 4/2012 | Ratnakar Aravind |
| 8,169,726 B2 | 5/2012 | Wilson |
| 8,174,784 B2 | 5/2012 | Grundvig et al. |
| 8,174,949 B2 | 5/2012 | Ratnakar Aravind |
| 8,237,597 B2 | 8/2012 | Liu et al. |
| 8,243,381 B2 | 8/2012 | Annampedu et al. |
| 8,254,049 B2 | 8/2012 | Annampedu |
| 8,261,171 B2 | 9/2012 | Annampedu |
| 2002/0150179 A1 | 10/2002 | Leis et al. |
| 2003/0193880 A1* | 10/2003 | Furumiya et al. .......... 369/275.3 |
| 2005/0243455 A1 | 11/2005 | Annampedu |
| 2007/0104300 A1 | 5/2007 | Esumi et al. |
| 2008/0056403 A1 | 3/2008 | Wilson |
| 2009/0142620 A1 | 6/2009 | Yamamoto et al. |
| 2009/0274247 A1 | 11/2009 | Galbraith et al. |
| 2010/0061490 A1 | 3/2010 | Noeldner |
| 2010/0067628 A1 | 3/2010 | Buehner et al. |
| 2010/0142078 A1 | 6/2010 | Annampedu et al. |
| 2011/0043938 A1 | 2/2011 | Mathew et al. |
| 2011/0157737 A1 | 6/2011 | Grundvig et al. |
| 2011/0209026 A1 | 8/2011 | Xia et al. |
| 2012/0036173 A1 | 2/2012 | Annampedu |
| 2012/0084336 A1 | 4/2012 | Yang et al. |
| 2012/0087035 A1 | 4/2012 | Graef |
| 2012/0106607 A1 | 5/2012 | Miladinovic et al. |
| 2012/0120784 A1 | 5/2012 | Yang et al. |
| 2012/0124241 A1 | 5/2012 | Yang et al. |
| 2012/0134042 A1 | 5/2012 | Annampedu et al. |
| 2012/0134043 A1 | 5/2012 | Annampedu |
| 2012/0155587 A1 | 6/2012 | Annampedu |
| 2012/0182643 A1 | 7/2012 | Zhang |
| 2012/0236428 A1 | 9/2012 | Xia |
| 2013/0003214 A1* | 1/2013 | Grundvig et al. ............... 360/51 |

OTHER PUBLICATIONS

Aziz and Annampedu, fiAsynchronous Maximum Likelihood (ML) Detection of Servo repeatable Run Out (RRO) Datafl Magnetics Conf. IEEE International5/2006.

J. Hagenauer and P. Hoeher, fiA Viterbi algorithm with soft-decision outputs and its applications,fl in Proc. IEEE Global Telecommunications Conference 1989, Dallas, Texas, No.

Kryder, M. et al "Heat Assisted Magnetic Recording" Proc. IEEE, vol. 96, No. 11, p. 1810, Nov. 2008.

Polikar, Robi "Ensemble Based Systems in Decision Making" IEEE Circuits and Systems Magazine Third qtr 2006, p. 21-47.

U.S. Appl. No. 13/316,899, Unpublished filed Dec. 12, 2011 (Haitao Xia).

U.S. Appl. No. 13/242,983, Unpublished filed Sep. 23, 2011 (Jeffrey P. Grundvig).

U.S. Appl. No. 13/173,088, Unpublished filed Jun. 30, 2011 (Jeffrey P. Grundvig).

U.S Appl. No. 13/100,021, Unpublished filed May 3, 2011 (Haitao Xia).

U.S. Appl. No. 13/096,873, Unpublished filed Apr. 28, 2011 (Ross S. Wilson).

U.S. Appl. No. 13/186,267, Unpublished filed Jul. 19, 2011 (Haitao Xia).

Weller et al "Thermal Limits in Ultrahigh-density Magnetic Recording" IEEE Trans. Magn. vol. 35, No. 6, p. 4423, Nov. 1999.

* cited by examiner

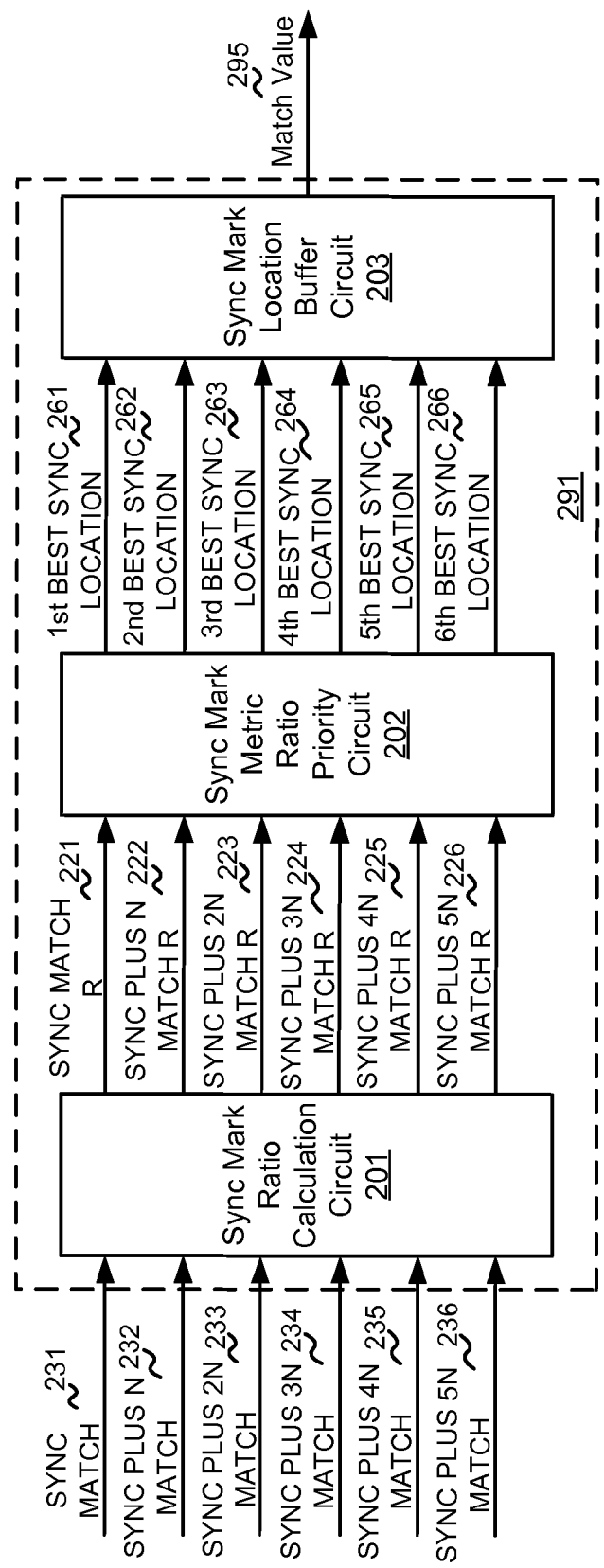

SYSTEMS AND METHODS FOR ENHANCED SYNC MARK DETECTION

BACKGROUND OF THE INVENTION

The present inventions are related to systems and methods for data processing, and more particularly to systems and methods for detecting patterns in a data stream.

Various circuits have been developed that provide for identifying synchronization marks within a data stream. As an example, a synchronization mark is identified based upon a threshold comparison. Such a threshold comparison approach depends highly upon determining an appropriate threshold for comparison. Where the selected threshold is too high, sync marks will be missed. Alternatively, where the selected threshold is too low, sync marks may be incorrectly identified. Either case is problematic for proper data processing.

Hence, for at least the aforementioned reasons, there exists a need in the art for advanced systems and methods for sync mark identification.

BRIEF SUMMARY OF THE INVENTION

The present inventions are related to systems and methods for data processing, and more particularly to systems and methods for detecting patterns in a data stream.

Various embodiments of the present invention provide data processing systems that include: a metric calculation circuit, a metric ratio calculation circuit, and a sync mark found circuit. The metric calculation circuit operable to provide at least a first comparison value corresponding to a comparison between a received input data set and a sync mark pattern, and a second comparison value corresponding to a comparison between the received input data set and a subset of the sync mark pattern and a subset of a preamble pattern. The metric ratio calculation circuit operable to calculate a first ratio of the first comparison value and the second comparison value, and a second ratio of the second comparison value and the third comparison value. The sync mark found circuit operable to compare the first ratio with the second ratio, and to assert a sync found signal based at least in part on the result of the comparison of the first ratio with the second ratio. In some cases, the aforementioned systems are implemented as part of an integrated circuit. In various cases, the systems are implemented as part of a storage device or a wireless communication device.

In various instances of the aforementioned embodiments, the sync mark pattern is M bits in length, the subset of the sync mark pattern is N bits in length, and the subset of the preamble pattern is M-N bits in length. In particular cases, M is twenty, and N may be four, eight, twelve or sixteen. In some cases, the sync mark pattern match calculation circuit is operable to process Y bits at a time, and the subset of the sync mark pattern is one of the 4Y most significant bits of the sync mark pattern, the 3Y most significant bits of the sync mark pattern, the 2Y most significant bits of the sync mark pattern, and the Y most significant bits of the sync mark pattern. In one or more cases where M is twenty and the subset of the sync mark pattern may be one of: the sixteen most significant bits of the sync mark pattern, the twelve most significant bits of the sync mark pattern, the eight most significant bits of the sync mark pattern, or the four most significant bits of the sync mark pattern.

In one or more instances of the aforementioned embodiments, the subset of the preamble pattern is a repeating portion of the preamble pattern. In various instances of the aforementioned embodiments where the sync mark pattern is twenty bits in length, the subset of the sync mark pattern is a first subset of the sync mark pattern, and the subset of the preamble pattern is a first subset of the preamble pattern, the sync mark pattern match calculation circuit is further operable to: provide a third comparison value corresponding to a comparison between the received input data set and a third subset of the sync mark pattern and a third subset of a preamble pattern; provide a fourth comparison value corresponding to a comparison between the received input data set and a fourth subset of the sync mark pattern and a fourth subset of a preamble pattern; and provide a fifth comparison value corresponding to a comparison between the received input data set and a fifth subset of the sync mark pattern and a fifth subset of a preamble pattern.

In some instances of the aforementioned embodiments, the system further includes a data detector circuit operable to apply a data detection algorithm to a portion of the received input data framed using the sync found signal to yield a detected output; and a data decoder circuit operable to apply a data decoding algorithm to the detected output to yield a decoded output. In various instances of the aforementioned embodiments, the system further includes a buffer operable to store a first location corresponding to the first ratio and a second location corresponding to the second ratio. In such instances, one of the first location and the second location is used to frame a user data set for data processing. In some such instances where the sync found signal is a first sync found signal, the portion of the received input data is a first portion of the received input data, the detected output is a first detected output, and the decoded output is a first decoded output, the data detector circuit may be further operable to apply the data detection algorithm to a second portion of the received input data framed using a second sync found signal corresponding to the second location to yield a second detected output, and the data decoder circuit may be further operable to apply the data decoding algorithm to the second detected output to yield a second decoded output.

Other embodiments of the present invention provide methods for detecting a data pattern. The methods include: receiving an input data set; comparing the input data set with a first portion of a sync mark pattern to yield a first comparison value using a comparing circuit; comparing the input data set with a second portion of the sync mark pattern to yield a second comparison value; comparing the input data set with a preamble pattern to yield a third comparison value; summing at least the first comparison value and the second comparison value to yield a first result; summing at least the second comparison value and the third comparison value to yield a second result; calculating a first ratio of the first result relative to the second result; calculating a second ratio of the second result relative to the first result; and asserting a sync found signal based upon the first ratio relative to the second ratio.

In some instances of the aforementioned embodiments, the methods further include: applying a data detection algorithm by a data detector circuit to a portion of the input data set to yield a detected output; and applying a data decoding algorithm to the detected output by a data decoder circuit to yield a decoded output. In some such cases where the sync found signal is a first sync found signal, the portion of the input data set is a first portion of the input data set, the detected output is a first detected output, and the decoded output is a first decoded output, the methods may further include: storing a first location corresponding to the first ratio and a second location corresponding to the second ratio; applying the data detection algorithm to a second portion of the input data set framed using a second sync found signal corresponding to the second location to yield a second detected output; and applying the data decoding algorithm to the second detected output to yield a second decoded output. In one particular case, applying the data detection algorithm to a second portion of the input data set framed using a second sync found signal is done only if the first decoded output fails to converge.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 2b graphically shows comparisons yielding the various outputs of a sync mark pattern match calculation circuit included in the ratio metric based sync mark detector circuit of FIG. 2a;

FIG. 2c depicts an implementation of a match metric calculation circuit in accordance with some embodiments of the present invention;

DETAILED DESCRIPTION OF THE INVENTION

The present inventions are related to systems and methods for data processing, and more particularly to systems and methods for detecting patterns in a data stream.

Figure 1:
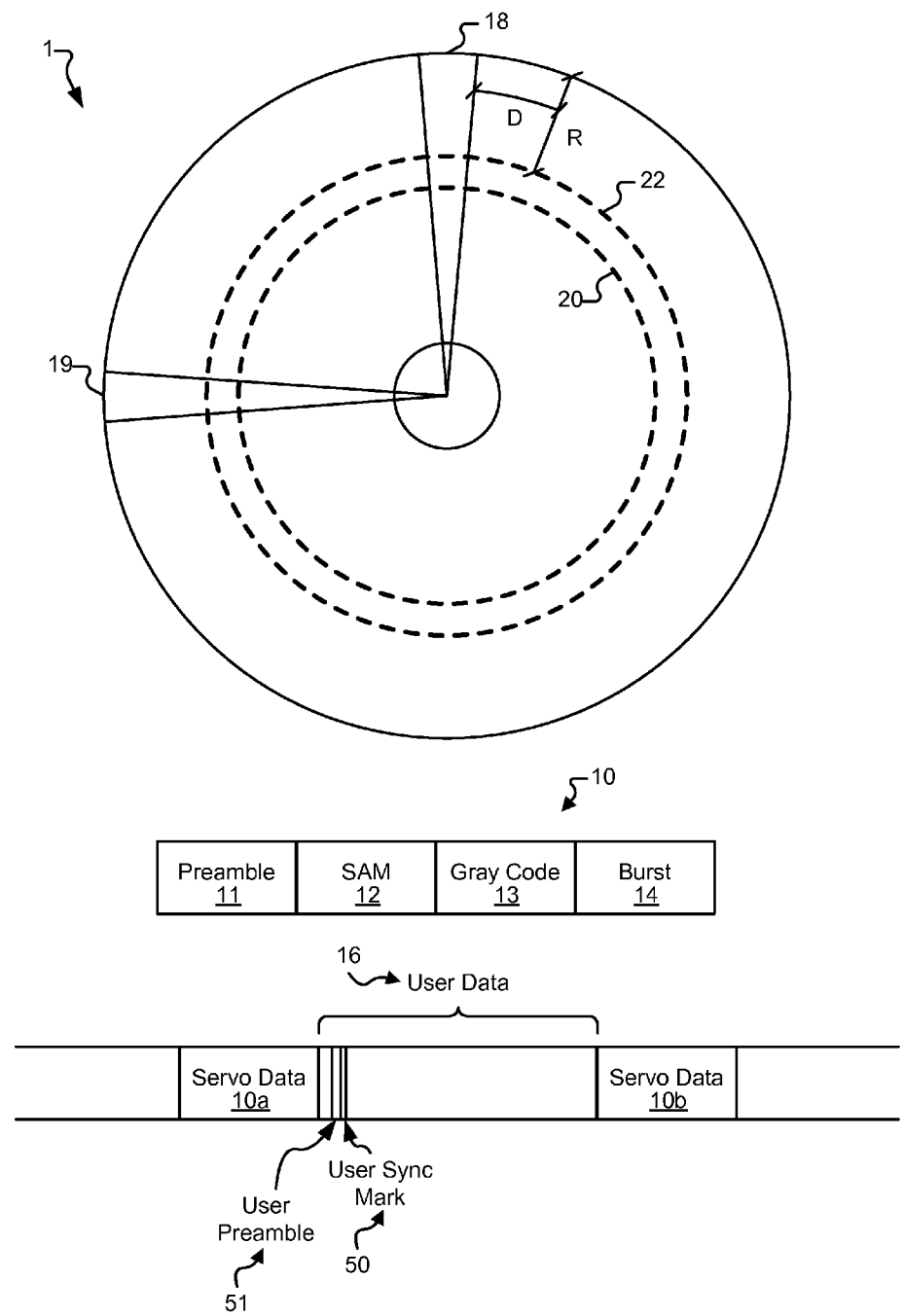
FIG. 1 is a block diagram of a known magnetic storage medium and sector data scheme consistent with existing art.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, the servo data generally includes a preamble pattern 11 followed by a servo address mark 12 (SAM). Servo address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 may include one or more sets of data that are stored to storage medium 1. The data sets may include user synchronization information some of which may be used as a mark to establish a point of reference from which processing of the data within user data region 16 may begin processing.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18. Once the user data region is reached, a user sync mark 50 is detected and used as a reference point from which data processing is performed. User sync mark 50 is preceded by a user preamble 51.

As used herein, the phrase "sync mark" is used in its broadest sense to mean any pattern that may be used to establish a point of reference. Thus, for example, a sync mark may be user sync mark 50 as is known in the art, or one or more portions of servo data bit patterns 10. Based upon the disclosure provided herein, one of ordinary skill in the art may recognize other sync marks that could be used in relation to different embodiments of the present invention.

It has been determined that some sync mark detection algorithms are prone to misidentifying non-sync mark data as a sync mark when the actual sync mark has been destroyed due to media defects or thermal asperity. One such sync mark detection algorithm is that discussed in U.S. patent application Ser. No. 12/946,048 entitled "Systems and Methods for Sync Mark Detection" and filed Nov. 15, 2010. The entirety of the aforementioned reference is incorporated herein for all purposes. Various embodiments of the present invention provide systems and methods for enhancing detection of the sync mark to reduce the possibility of misidentification. The aforementioned embodiments compare portions of a known sync mark pattern and/or preamble pattern with a different offsets of a received input data set to yield a number of match values. The smaller the match values, the greater the likelihood that a sync mark has been detected. In particular cases, these match values are Euclidean distance values. A ratio metric for each of these match values is then calculated and used to declare a sync mark. In particular, ratios between the current match value and each of the alternative match values are calculated, and a minimum of the ratios is selected for further consideration. The larger the ratio, the more reliable the sync mark detection is found to be.

In some cases, the minimum ratio for each match value is maintained in a buffer. Where a selected sync mark fails to yield a converged output, it may be assumed that the failure was due t least in part to a misidentified sync mark. Based on the assumption, a next best sync mark as indicated by the stored ratios is selected, and the received data reframed based upon the next best sync mark. The data processing is then re-applied to the reframed data based upon the next best sync mark.

Figure 2A:
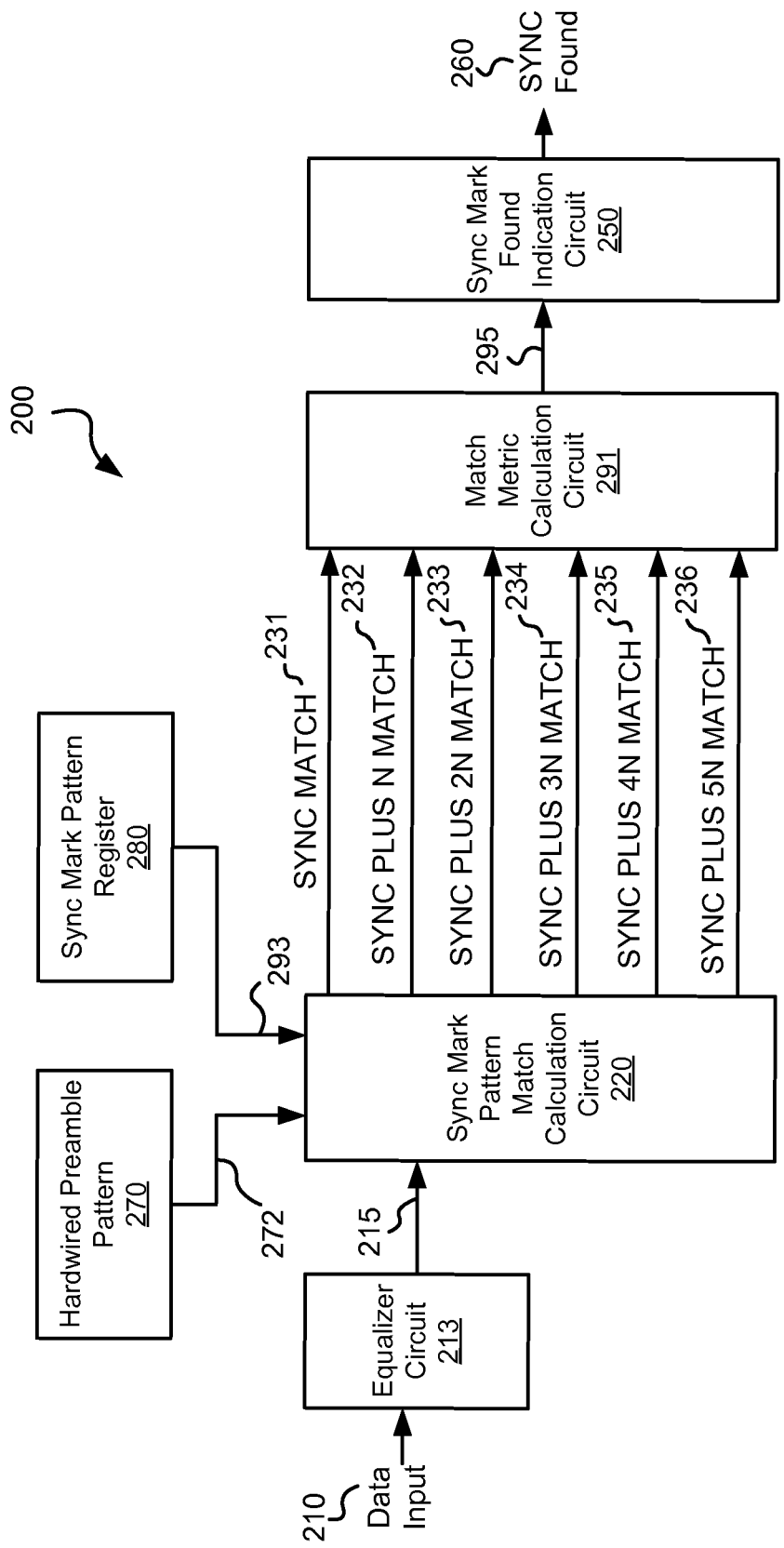
FIG. 2a depicts a ratio metric based sync mark detector circuit in accordance with one or more embodiments of the present invention.

Turning to FIG. 2a, a ratio metric based sync mark detector circuit 200 is shown in accordance with one or more embodiments of the present invention. Sync mark detector circuit 200 includes an equalizer circuit 213 that receives a data input 210 and provides an equalized output 215. In some embodiments, equalizer circuit 213 is a digital finite impulse response filter as are known in the art. Data input 210 may be a series of digital samples. The digital samples may represent, for example, data stored on a storage medium or data received via a wireless communication medium. Based upon the disclosure provided herein, one of ordinary skill in the art will recognize a variety of sources of data input 210.

Equalizer output 215 is provided to a sync mark pattern match calculation circuit 220. Sync mark pattern match calculation circuit 220 compares equalizer output 215 with a preamble pattern 272 from a hardwired preamble pattern 270 and to a sync mark pattern 293 from a sync mark pattern register 280. Sync mark pattern register 280 may either be hard coded, or reprogrammable depending upon the particular implementation. In some embodiments of the present invention, the sync mark stored in sync mark pattern register 280 is a defined pattern of twenty bits in length. In contrast, hardwired preamble pattern 270 includes a repeating portion of a preamble pattern. In some embodiments of the present invention, the preamble that precedes the sync mark pattern repeats every two cycles. As such, the preamble pattern includes twenty or more bits of the preamble repeating as follows: '11001100110011001100'. In such a case, preamble pattern 272 is '1100'.

The comparison done by sync mark pattern match calculation circuit 220 yields a number of values corresponding to a difference between equalizer output 215 and various components of preamble pattern 272 and sync mark pattern 293. In some particular embodiments of the present invention, the comparison is a Euclidean distance between equalizer output 215 and the particular pattern to which it is being compared in accordance with the following equation:

$$\text{Output} = \sum_{k=0}^{i} (\text{equalizer output}_k - \text{comparison pattern}_k)^2,$$

where k represents an individual sample value. In particular, sync mark pattern match calculation circuit 220 provides a sync match output 231 that corresponds to a comparison between the bits of sync mark pattern 293 and the same number of bits of equalizer output 215. Sync mark pattern match calculation circuit 220 also provides: a sync plus N match output 232 that corresponds to a comparison between the bits of sync mark pattern 293 less the most recent N bits of sync mark pattern 293, and the same number of bits of equalizer output 215; a sync plus 2N match output 233 that corresponds to a comparison between the bits of sync mark pattern 293 less the most recent 2N bits of sync mark pattern 293, and the same number of bits of equalizer output 215; a sync plus 3N match output 234 that corresponds to a comparison between the bits of sync mark pattern 293 less the most recent 3N bits of sync mark pattern 293, and the same number of bits of equalizer output 215; a sync plus 4N match output 235 that corresponds to a comparison between the bits of sync mark pattern 293 less the most recent 4N bits of sync mark pattern 293, and the same number of bits of equalizer output 215; a sync plus 5N match output 236 that corresponds to a comparison between the bits of sync mark pattern 293 less the most recent 5N bits of sync mark pattern 293, and the same number of bits of equalizer output 215. In one particular embodiment of the present invention, sync mark pattern 293 is twenty bits in length, and the value of N is four bits. Based upon the disclosure provided herein, one of ordinary skill in the art will recognize a variety of lengths of sync bit patterns and corresponding values of N that may be used in relation to different embodiments of the present invention.

Figure 2B:
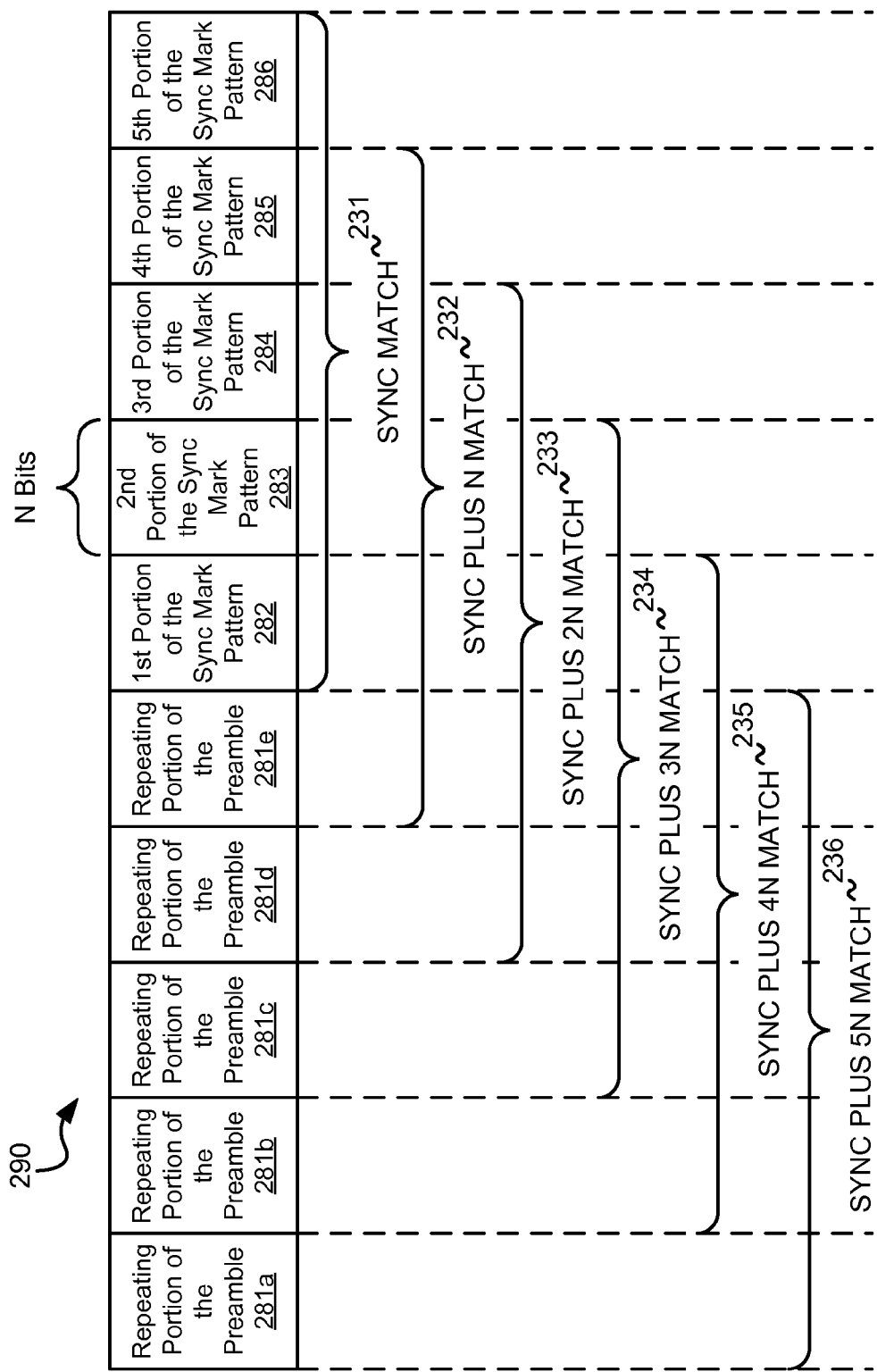

FIG. 2b graphically shows comparisons yielding the various outputs of a sync mark pattern match calculation circuit 220 that were described above. In particular, a time line 290 shows N-bit preamble pattern 272 repeated a number of times (i.e., elements 281a, 281b, 281c, 281d, 281e) and a number of different N-bit portions (i.e., elements 282, 283, 284, 285, 286) of sync mark pattern 293 lined up in time as they would be expected to be received as part of an incoming data stream. As shown, sync match output 231 corresponds to a comparison (e.g., a Euclidean difference) between equalizer output 215 and the five consecutive N-bit portions 282, 283, 284, 285, 286 of sync mark pattern 293. Sync plus N match output 232 corresponds to a comparison (e.g., a Euclidean difference) between equalizer output 215 and one N-bit portion of the preamble 281e appended with the four least recent N-bit portions 282, 283, 284, 285 of sync mark pattern 293. Sync plus 2N match output 233 corresponds to a comparison (e.g., a Euclidean difference) between equalizer output 215 and two N-bit portions of the preamble 281d, 281e appended with the three least recent N-bit portions 282, 283, 284 of sync mark pattern 293. Sync plus 3N match output 234 corresponds to a comparison (e.g., a Euclidean difference) between equalizer output 215 and three N-bit portions of the preamble 281c, 281d, 281e appended with the two least recent N-bit portions 282, 283 of sync mark pattern 293. Sync plus 4N match output 235 corresponds to a comparison (e.g., a Euclidean difference) between equalizer output 215 and four N-bit portions of the preamble 281b, 281c, 281d, 281e appended with the least recent N-bit portion 282 of sync mark pattern 293. Sync plus 5N match output 236 corresponds to a comparison (e.g., a Euclidean difference) between equalizer output 215 and five N-bit portions of the preamble 281a, 281b, 281c, 281d, 281e.

Referring again to FIG. 2a, sync match output 231, sync plus N match output 232, sync plus 2N match output 233, sync plus 3N match output 234, sync plus 4N match output 235 and sync plus 5N match output 236 are provided to a match metric calculation circuit 291. Match metric calculation circuit 291, calculates a ratio between each of sync match output 231, sync plus N match output 232, sync plus 2N match output 233, sync plus 3N match output 234, sync plus 4N match output 235 and sync plus 5N match output 236 and the other match outputs, and selects a minimum value as a match value 295.

Turning to FIG. 2c, one implementation of match metric calculation circuit 291 is shown in accordance with some embodiments of the present invention. As shown, match metric calculation circuit 291 includes a sync mark ratio calculation circuit 201, a sync mark metric ratio priority circuit 202, and a sync mark location buffer circuit 203. Sync match output 231, sync plus N match output 232, sync plus 2N match output 233, sync plus 3N match output 234, sync plus 4N match output 235 and sync plus 5N match output 236 are provided from sync mark pattern match calculation circuit 220 to sync mark ratio calculation circuit 201. Sync mark ratio calculation circuit 201 calculates a ratio of the minimum of other sync match values and the tested sync match value. In particular, sync mark ratio calculation circuit 201 calculates a ratio for each of Sync match output 231, sync plus N match output 232, sync plus 2N match output 233, sync plus 3N match output 234, sync plus 4N match output 235 and sync plus 5N match output 236 in accordance with the following equations:

$$\text{SYNC MATCH } R\ 221 = \text{Min}(\text{SYNC PLUS } N \text{ MATCH } 232,$$
$$\text{SYNC PLUS } 2N \text{ MATCH } 233,$$
$$\text{SYNC PLUS } 3N \text{ MATCH } 234,$$
$$\text{SYNC PLUS } 4N \text{ MATCH } 235,$$
$$\text{SYNC PLUS } 5N \text{ MATCH } 236)/$$
$$\text{SYNC MATCH } 231;$$

$$\text{SYNC MATCH } R\ 222 = \text{Min}(\text{SYNC MATCH } 231,$$
$$\text{SYNC PLUS } 2N \text{ MATCH } 233,$$
$$\text{SYNC PLUS } 3N \text{ MATCH } 234,$$
$$\text{SYNC PLUS } 4N \text{ MATCH } 235,$$
$$\text{SYNC PLUS } 5N \text{ MATCH } 236)/$$
$$\text{SYNC PLUS } N \text{ MATCH} 232;$$

$$\text{SYNC MATCH } R\ 223 = \text{Min}(\text{SYNC MATCH } 231,$$
$$\text{SYNC PLUS } 2N \text{ MATCH } 232,$$
$$\text{SYNC PLUS } 3N \text{ MATCH } 234,$$
$$\text{SYNC PLUS } 4N \text{ MATCH } 235,$$
$$\text{SYNC PLUS } 5N \text{ MATCH } 236)/$$
$$\text{SYNC PLUS } 2N \text{ MATCH } 233;$$

$$\text{SYNC MATCH } R\ 224 = \text{Min}(\text{SYNC MATCH } 231,$$
$$\text{SYNC PLUS } 2N \text{ MATCH } 232,$$
$$\text{SYNC PLUS } 2N \text{ MATCH } 233,$$
$$\text{SYNC PLUS } 4N \text{ MATCH } 235,$$
$$\text{SYNC PLUS } 5N \text{ MATCH } 236)/$$
$$\text{SYNC PLUS } 3N \text{ MATCH } 234;$$

$$\text{SYNC MATCH } R\ 225 = \text{Min}(\text{SYNC MATCH } 231,$$
$$\text{SYNC PLUS } 2N \text{ MATCH } 232,$$
$$\text{SYNC PLUS } 2N \text{ MATCH } 233,$$
$$\text{SYNC PLUS } 3N \text{ MATCH } 234,$$
$$\text{SYNC PLUS } 5N \text{ MATCH } 236)/$$
$$\text{SYNC PLUS } 4N \text{ MATCH } 235;$$

$$\text{SYNC MATCH } R\ 225 = \text{Min}(\text{SYNC MATCH } 231,$$
$$\text{SYNC PLUS } 2N \text{ MATCH } 232,$$
$$\text{SYNC PLUS } 2N \text{ MATCH } 233,$$
$$\text{SYNC PLUS } 3N \text{ MATCH } 234,$$
$$\text{SYNC PLUS } 4N \text{ MATCH } 235)/$$
$$\text{SYNC PLUS } 5N \text{ MATCH } 236.$$

The calculated ratio sync match output R 231, sync plus N match output R 232, sync plus 2N match output R 233, sync plus 3N match output R 234, sync plus 4N match output R 235 and sync plus 5N match output R 236 are provided to sync mark metric ratio priority circuit 202. Sync mark metric ratio priority circuit 202 places the received ratio values in a priority order with the highest value being identified as a first best sync location 261 (i.e., the location in a data set where the sync mark associated with the highest value sync match ratio value from sync mark ratio calculation circuit 201), and the lower values being placed in descending order. The prioritized locations are provided from sync mark metric ratio priority circuit 202 as: first best sync location 261, a second best sync location 262, a third best sync location 263, a fourth best sync location 264, a fifth best sync location 265, and a sixth best sync location 266. These priority locations are stored to a sync mark location buffer circuit 203. Sync mark location buffer circuit 203 provides first best sync location 261 as a match value 295, while maintaining the other lower priority locations for possible future use where the framing of the data set corresponding to first best sync location 261 fails to yield a converged data set.

Referring again to FIG. 2a, match value 295 is provided to a sync mark found indication circuit 250. Sync mark found indication circuit 250 asserts a sync found output 260 that is located in accordance with match value 295 and used to frame the data set from which the sync mark was found for data processing. This framing process may be any process known in the art that is used to indicate the location of user data within an overall data set including both the user data and the sync mark pattern to which the match value corresponds.

Figure 3A:
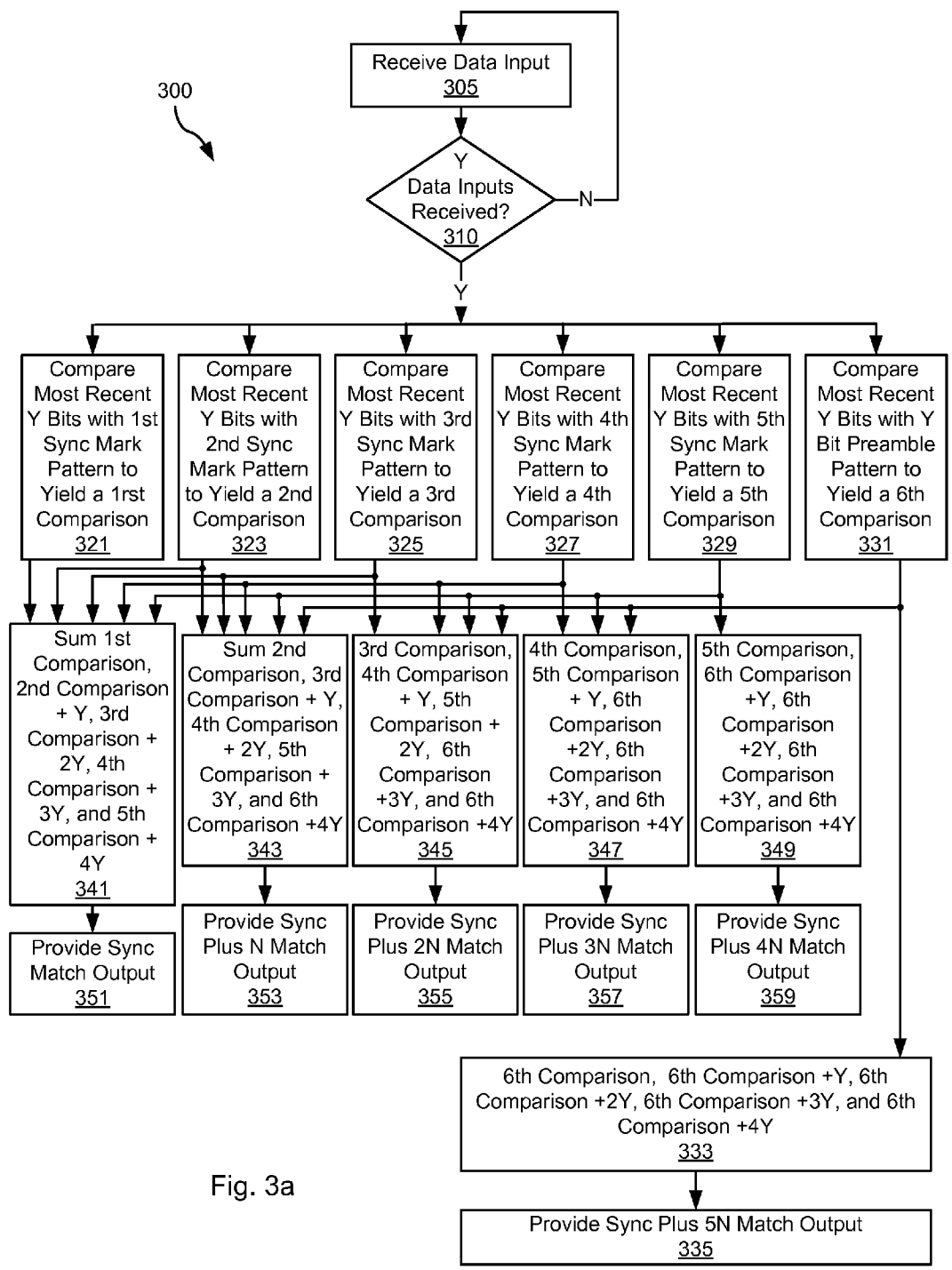
FIG. 3a-3b are flow diagrams showing a method in accordance with some embodiments of the present invention for performing a ratio metric based sync mark detection.
Figure 3B:
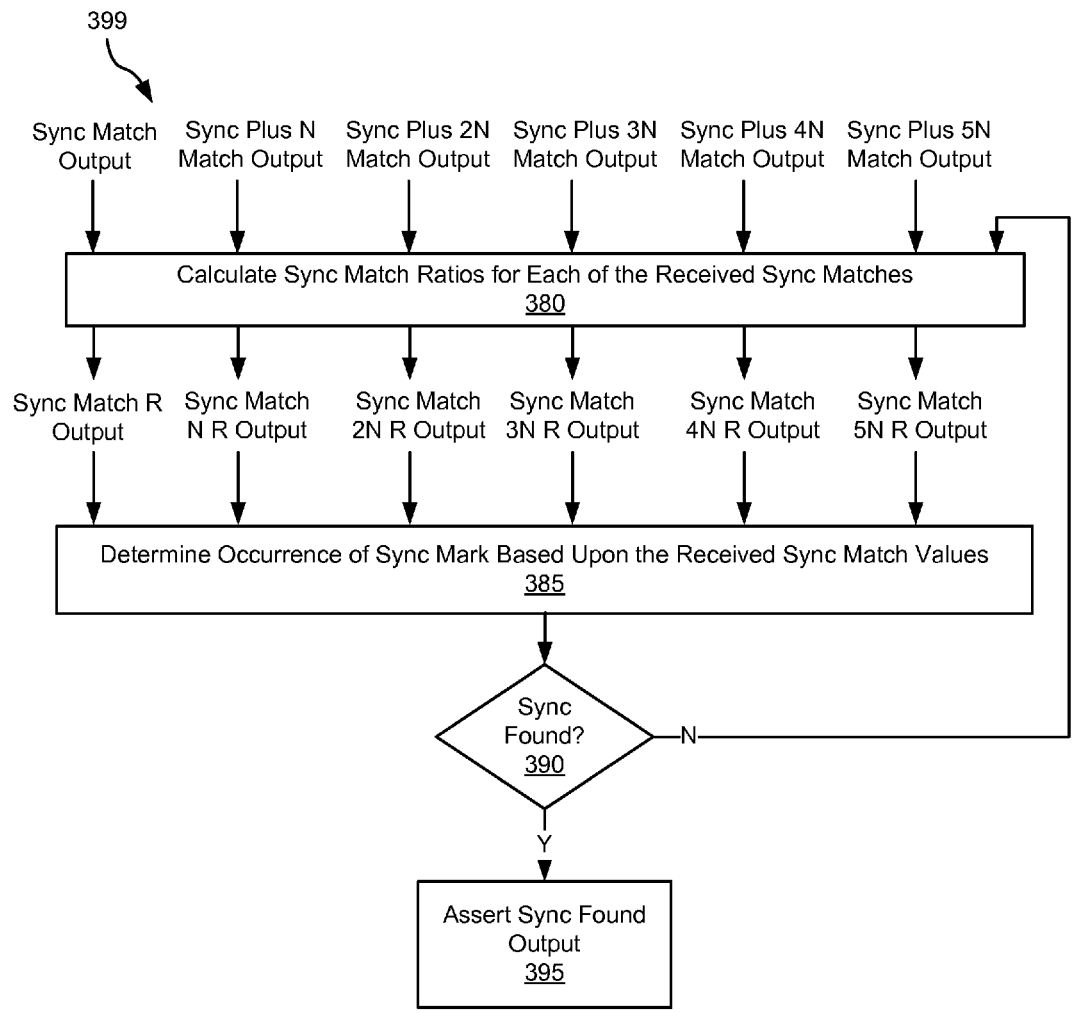

Turning to FIGS. 3a-3b, are flow diagrams 300, 399 showing a method in accordance with one or more embodiments of the present invention for performing a ratio metric based sync mark detection. Following flow diagram 300, data samples are received as a data input (block 305). The received data samples may be derived from, for example, a storage medium or a wireless transfer medium. Based upon the disclosure provided herein, one of ordinary skill in the art will recognize a variety of sources of the data samples. It is determined whether Y samples have been received (block 310). In some embodiments of the present invention, Y is four bits. Based upon the disclosure provided herein, one of ordinary skill in the art will recognize other values for Y that may be used in relation to different embodiments of the present invention. Where Y samples have not yet been received (block 310), the process returns to await additional samples (block 305).

Alternatively, where Y samples have been received (block 310), the most recently received Y bits are compared with various patterns. In particular, the most recently received Y bits are compared with a first sync mark pattern to yield a first comparison (i.e., the Y least significant bits of the sync mark pattern) (block 321). In some cases, the comparison is a Euclidean distance between the received four bits and the first sync mark pattern in accordance with the following equation:

$$\text{First Comparison} = \sum_{k=0}^{Y-1} (Y \text{ Sample}_k - \text{First Sync Mark Pattern}_k)^2.$$

In addition, the most recently received Y bits are compared with a second sync mark pattern to yield a second comparison (i.e., the next Y least significant bits of the sync mark pattern) (block 323). In some cases, the comparison is a Euclidean distance between the received four bits and the second sync mark pattern in accordance with the following equation:

$$\text{Second Comparison} = \sum_{k=0}^{Y-1} (Y\text{ Sample}_k - \text{Second Sync Mark Pattern}_{k+Y})^2.$$

In addition, the most recently received Y bits are compared with a third sync mark pattern to yield a third comparison (i.e., the next Y least significant bits of the sync mark pattern) (block 325). In some cases, the comparison is a Euclidean distance between the received four bits and the third sync mark pattern in accordance with the following equation:

$$\text{Third Comparison} = \sum_{k=0}^{Y-1} (Y\text{ Sample}_k - \text{Third Sync Mark Pattern}_{k+2Y})^2.$$

In addition, the most recently received Y bits are compared with a fourth sync mark pattern to yield a fourth comparison (i.e., the next Y least significant bits of the sync mark pattern) (block 327). In some cases, the comparison is a Euclidean distance between the received four bits and the fourth sync mark pattern in accordance with the following equation:

$$\text{Fourth Comparison} = \sum_{k=0}^{Y-1} (Y\text{ Sample}_k - \text{Forth Sync Mark Pattern}_{k+3Y})^2.$$

In addition, the most recently received Y bits are compared with a fifth sync mark pattern to yield a fifth comparison (i.e., the next Y least significant bits of the sync mark pattern) (block 329). In some cases, the comparison is a Euclidean distance between the received four bits and the fifth sync mark pattern in accordance with the following equation:

$$\text{Fifth Comparison} = \sum_{k=0}^{Y-1} (Y\text{ Sample}_k - \text{Fifth Sync Mark Pattern}_{k+3Y})^2.$$

In addition, the most recently received Y bits are compared with a Y bit preamble pattern to yield a sixth comparison (i.e., the next Y least significant bits of the sync mark pattern) (block 331). In some cases, the comparison is a Euclidean distance between the received four bits and the fifth sync mark pattern in accordance with the following equation:

$$\text{Sixth Comparison} = \sum_{k=0}^{Y-1} (Y\text{ Sample}_k - \text{Preamble Pattern}_k)^2.$$

The aforementioned comparison outputs are then combined to yield interim outputs. In particular, the first comparison is summed with the second comparison delayed by Y bit periods, the third comparison delayed by 2Y bit periods, the fourth comparison delayed by 3Y bit periods, and the fifth comparison delayed by 4Y bit periods to yield a first interim output (block 341). This first interim output is provided as a sync match output (block 351). In addition, the second comparison is summed with the third comparison delayed by Y bit periods, the fourth comparison delayed by 2Y bit periods, the fifth comparison delayed by 3Y bit periods, and the sixth comparison delayed by 4Y bit periods to yield a second interim output (block 343). This first interim output is provided as a sync plus N match output (block 353). In addition, the third comparison is summed with the fourth comparison delayed by Y bit periods, the fifth comparison delayed by 2Y bit periods, the sixth comparison delayed by 3Y bit periods, and the sixth comparison delayed by 4Y bit periods to yield a second interim output (block 345). This first interim output is provided as a sync plus 2N match output (block 355). In addition, the fourth comparison is summed with the fifth comparison delayed by Y bit periods, the sixth comparison delayed by 2Y bit periods, the sixth comparison delayed by 3Y bit periods, and the sixth comparison delayed by 4Y bit periods to yield a second interim output (block 347). This first interim output is provided as a sync plus 3N match output (block 357). In addition, the fifth comparison is summed with the sixth comparison delayed by Y bit periods, the sixth comparison delayed by 2Y bit periods, the sixth comparison delayed by 3Y bit periods, and the sixth comparison delayed by 4Y bit periods to yield a second interim output (block 349). This first interim output is provided as a sync plus 4N match output (block 359). In addition, the sixth comparison is summed with the sixth comparison delayed by Y bit periods, the sixth comparison delayed by 2Y bit periods, the sixth comparison delayed by 3Y bit periods, and the sixth comparison delayed by 4Y bit periods to yield a second interim output (block 333). This first interim output is provided as a sync plus 5N match output (block 335).

Following flow diagram 399, each of the aforementioned sync match output, the sync plus N match output, the sync plus 2N match output, the sync plus 3N match output, the sync plus 4N match output, and the sync plus 5N match output are used to calculate sync match ratios for each of the received sync matches (block 380). In particular, a ratio of the minimum of other sync match values and the tested sync match value is calculated. These ratios may be calculated for each of the sync match output, the sync plus N match output, the sync plus 2N match output, the sync plus 3N match output, the sync plus 4N match output, and the sync plus 5N match output in accordance with the following equations:

$$\text{SYNC MATCH } R = \text{Min}(\text{SYNC PLUS } N \text{ MATCH},$$
$$\text{SYNC PLUS } 2N \text{ MATCH},$$
$$\text{SYNC PLUS } 3N \text{ MATCH},$$
$$\text{SYNC PLUS } 4N \text{ MATCH},$$
$$\text{SYNC PLUS } 5N \text{ MATCH})/$$
$$\text{SYNC MATCH};$$

$$\text{SYNC MATCH } N \text{ } R = \text{Min}(\text{SYNC MATCH},$$
$$\text{SYNC PLUS } 2N \text{ MATCH},$$
$$\text{SYNC PLUS } 3N \text{ MATCH},$$
$$\text{SYNC PLUS } 4N \text{ MATCH},$$
$$\text{SYNC PLUS } 5N \text{ MATCH})/$$
$$\text{SYNC PLUS } N \text{ MATCH};$$

-continued

```
SYNC MATCH 2N R = Min(SYNC MATCH,
                     SYNC PLUS N MATCH,
                     SYNC PLUS 3N MATCH,
                     SYNC PLUS 4N MATCH,
                     SYNC PLUS 5N MATCH)/
                     SYNC PLUS 2N MATCH;
SYNC MATCH 3N R = Min(SYNC MATCH,
                     SYNC PLUS N MATCH,
                     SYNC PLUS 2N MATCH,
                     SYNC PLUS 4N MATCH,
                     SYNC PLUS 5N MATCH)/
                     SYNC PLUS 3N MATCH;
SYNC MATCH 4N R = Min(SYNC MATCH,
                     SYNC PLUS N MATCH,
                     SYNC PLUS 2N MATCH,
                     SYNC PLUS 3N MATCH,
                     SYNC PLUS 5N MATCH)/
                     SYNC PLUS 4N MATCH;
SYNC MATCH 5N R = Min(SYNC MATCH,
                     SYNC PLUS N MATCH,
                     SYNC PLUS 2N MATCH,
                     SYNC PLUS 3N MATCH,
                     SYNC PLUS 4N MATCH)/
                     SYNC PLUS 5N MATCH.
```

The aforementioned sync match ratio values (Sync Match R, Sync Match N R, Sync Match 2N R, Sync Match 3N R, Sync Match 4N R, Sync Match 5N R) are used to determine an occurrence of a sync mark (block 385). It is determined whether one of the sync match ratio values is substantially greater than unity (block 390). In one particular embodiment of the present invention, it is determined whether one of the sync match ratio values is greater than 1.4. Based upon the disclosure provided herein, one of ordinary skill in the art will recognize a variety of threshold values that may be used in relation to different embodiments of the present invention to determine whether a sync mark has been found. Where it is determined that the sync mark was found (block 390), a sync mark found output is asserted (block 395).

Figure 4:
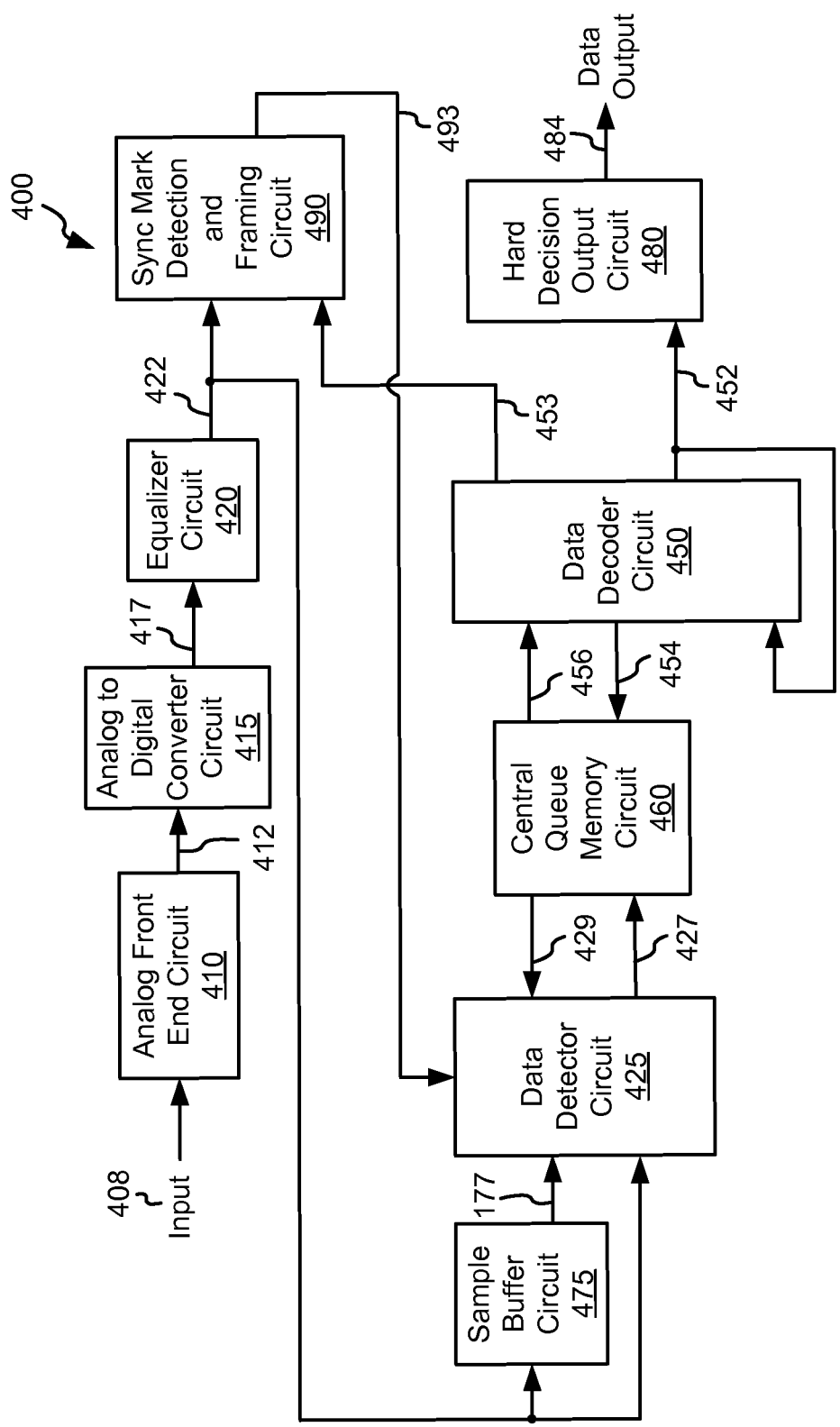
FIG. 4 depicts a data processing circuit including a sync mark detection and framing circuit in accordance with some embodiments of the present invention.

Turning to FIG. 4, a data processing circuit 400 including a sync mark detection and framing circuit is shown in accordance with some embodiments of the present invention. Data processing circuit 400 includes an analog front end circuit 410 that receives an analog input 408. Analog front end circuit 410 processes analog input 408 and provides a processed analog signal 412 to an analog to digital converter circuit 415. Analog front end circuit 410 may include, but is not limited to, an analog filter and an amplifier circuit as are known in the art. Based upon the disclosure provided herein, one of ordinary skill in the art will recognize a variety of circuitry that may be included as part of analog front end circuit 410. In some cases, analog input 408 is derived from a read/write head assembly (not shown) that is disposed in relation to a storage medium (not shown). In other cases, analog input 408 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 108 may be derived.

Analog to digital converter circuit 415 converts processed analog signal 412 into a corresponding series of digital samples 417. Analog to digital converter circuit 415 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 417 are provided to an equalizer circuit 420. Equalizer circuit 420 applies an equalization algorithm to digital samples 417 to yield an equalized output 422. In some embodiments of the present invention, equalizer circuit 420 is a digital finite impulse response filter circuit as are known in the art.

Equalized output 422 is provided to a data detector circuit 425, a sample buffer circuit 475, and a sync mark detection and framing circuit 490. Sync mark detection and framing circuit 490 includes a ratio metric based sync mark detector circuit similar to that discussed above in relation to FIGS. 2a-2c. Sync mark detection and framing circuit 490 applies the aforementioned ratio based sync mark detection algorithm to identify one or more possible sync marks. The sync marks are used to generate a framing signal 493 that is used to indicate a location of the beginning of a user data set within equalized output 422.

Sample buffer circuit 475 stores equalized output 422 as buffered data 477 for use in subsequent iterations through data detector circuit 425. Data detector circuit 425 may be any data detector circuit known in the art that is capable of producing a detected output 427. As some examples, data detector circuit 425 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 425 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 427 is provided to a central queue memory circuit 460 that operates to buffer data passed between data detector circuit 425 and data decoder circuit 450. In some cases, central queue memory circuit 460 includes interleaving (i.e., data shuffling) and de-interleaving (i.e., data un-shuffling) circuitry known in the art. When data decoder circuit 450 is available, data decoder circuit 450 accesses detected output 427 from central queue memory circuit 460 as a decoder input 456. Data decoder circuit 450 applies a data decoding algorithm to decoder input 456 in an attempt to recover originally written data. The result of the data decoding algorithm is provided as a decoded output 452. Similar to detected output 427, decoded output 452 may include both hard decisions and soft decisions. For example, data decoder circuit 450 may be any data decoder circuit known in the art that is capable of applying a decoding algorithm to a received input. Data decoder circuit 450 may be, but is not limited to, a low density parity check (LDPC) decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, decoded output 452 is stored to a memory included in a hard decision output circuit 480. In turn, hard decision output circuit 480 provides the converged decoded output 452 as a data output 484 to a recipient (not shown). The recipient may be, for example, an interface circuit operable to receive processed data sets. Based upon the disclosure provided herein, one of ordinary skill in the art will recognize a variety of recipients that may be used in relation to different embodiments of the present invention. Where the original data is not recovered (i.e., the data decoding algorithm failed to converge) prior to a timeout condition, decoded output 452 indicates that the data is unusable as is more specifically discussed below, and data output 484 is similarly identified as unusable.

Data decoder circuit 453 additionally provides a framing signal selection signal 453 to sync mark detection and framing circuit 490 that causes sync mark detection and framing circuit 490 to provide a next best framing signal 493. Equalized output 422 is then re-processed using the new framing signal 493 indicating a different starting location of user data in equalized output 422. In some embodiments of the present invention, framing signal selection signal 453 is asserted to cause another framing signal to be provided under particular conditions. Such conditions may include, for example, a failure of data decoder circuit 450 to converge after a defined number of global iterations, and/or where a number of unsatisfied checks exceed a defined level after a defined number of global iterations have occurred in relation to the currently processing data set. Based upon the disclosure provided herein, one of ordinary skill in the art will recognize a variety of conditions upon which a next best framing signal is selected to restart the processing.

One or more iterations through the combination of data detector circuit 425 and data decoder circuit 450 may be made in an effort to converge on the originally written data set. As mentioned above, processing through both the data detector circuit and the data decoder circuit is referred to as a "global iteration". For the first global iteration, data detector circuit 425 applies the data detection algorithm to equalized output 422 without guidance from a decoded output. For subsequent global iterations, data detector circuit 425 applies the data detection algorithm to buffered data 477 as guided by decoded output 452. To facilitate this guidance, decoded output 452 is stored to central queue memory circuit 460 as a decoder output 454, and is provided from central queue memory circuit 460 as a detector input 429 when equalized output 422 is being re-processed through data detector circuit 425.

During each global iteration it is possible for data decoder circuit 450 to make one or more local iterations including application of the data decoding algorithm to decoder input 456. For the first local iteration, data decoder circuit 450 applies the data decoder algorithm without guidance from decoded output 452. For subsequent local iterations, data decoder circuit 450 applies the data decoding algorithm to decoder input 456 as guided by a previous decoded output 452. The number of local iterations allowed may be, for example, ten. Based upon the disclosure provided herein, one of ordinary skill in the art will recognize a variety of different numbers of local iterations that may be allowed in accordance with different embodiments of the present invention. Where the number of local iterations through data decoder circuit 450 exceeds that allowed, but it is determined that at least one additional global iteration during standard processing of the data set is allowed, decoded output 452 is provided back to central queue memory circuit 460 as decoded output 454. Decoded output 454 is maintained in central queue memory circuit 460 until data detector circuit 425 becomes available to perform additional processing.

In contrast, where the number of local iterations through data decoder circuit 450 exceeds that allowed and it is determined that the allowable number of global iterations has been surpassed for the data set and/or a timeout or memory usage calls for termination of processing of the particular data set, standard processing of the data set concludes and an error is indicated. In some cases, retry processing or some offline processing may be applied to recover the otherwise unconverged data set. Based upon the disclosure provided herein, one of ordinary skill in the art will recognize a variety of non-standard processing techniques that may be applied to recover the otherwise unrecoverable data set.

Figure 5A:
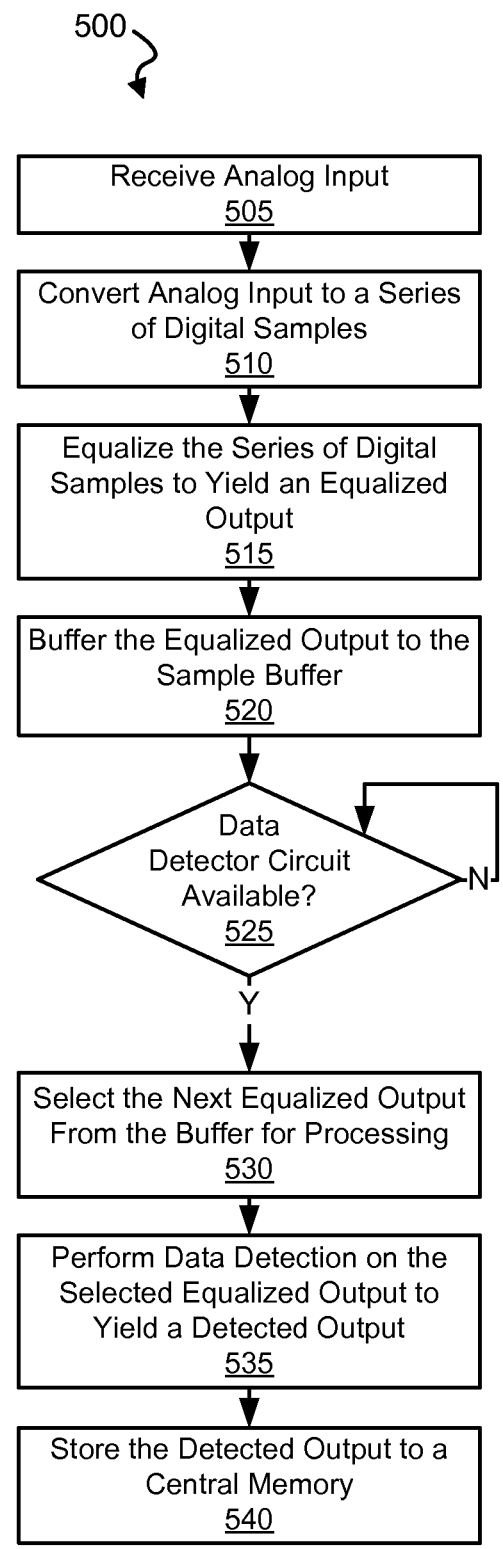
FIGS. 5a-5b are flow diagrams showing a method in accordance with one or more embodiments of the present invention for data processing using different sync marks prioritized based upon a ratio metric.
Figure 5B:
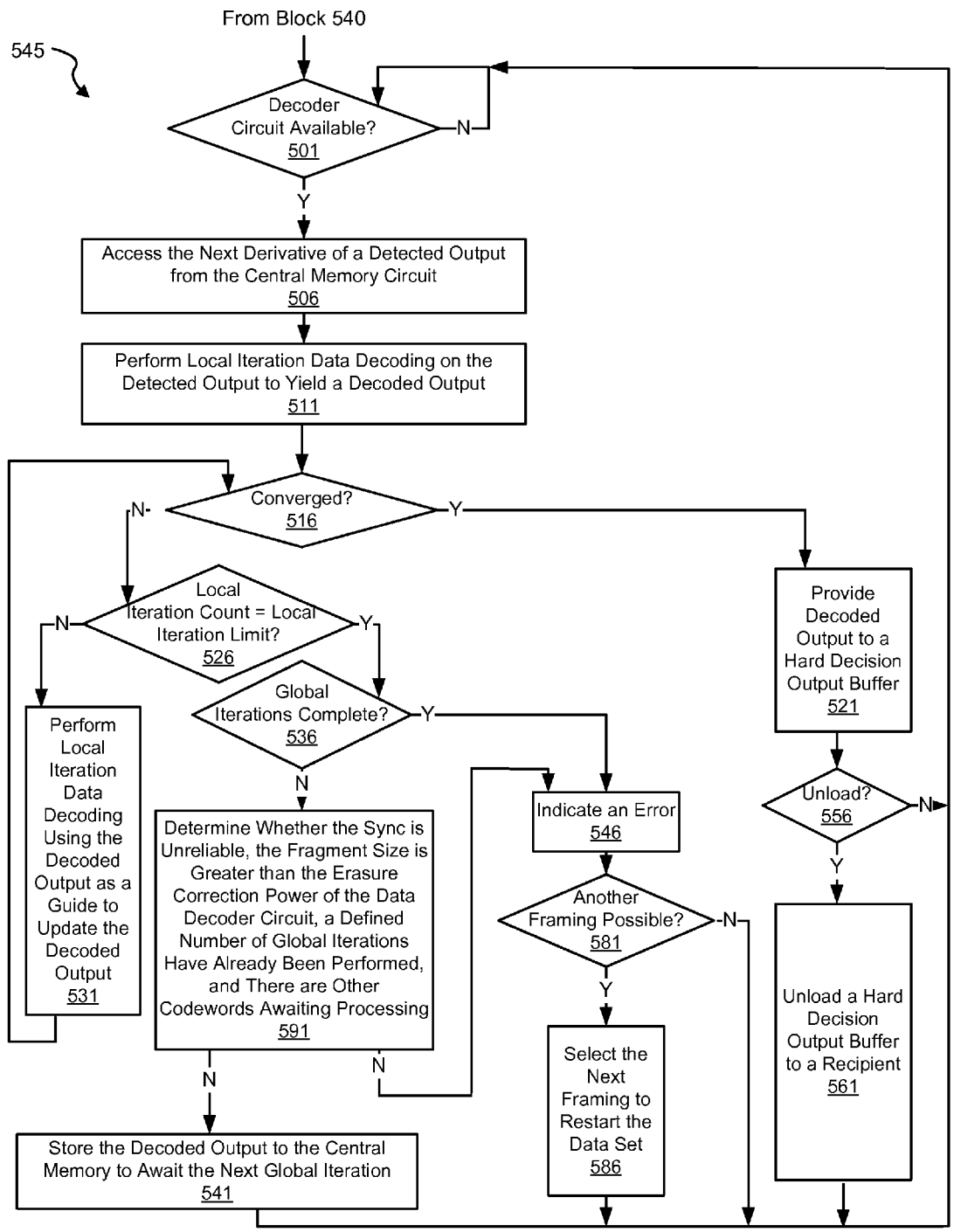

Turning to FIGS. 5*a*-5*b*, flow diagrams 500, 545 show a method in accordance with one or more embodiments of the present invention for data processing using different sync marks prioritized based upon a ratio metric. Following flow diagram 500, an analog input is received (block 505). The analog input may be derived from, for example, a storage medium or a data transmission channel. Based upon the disclosure provided herein, one of ordinary skill in the art will recognize a variety of sources of the analog input. The analog input is converted to a series of digital samples (block 510). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 515). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The equalized output is buffered (block 520).

It is determined whether a main data detector circuit is available (block 525). Where the main data detector circuit is available (block 525), the next equalized output from the sample buffer is selected for processing (block 530), and a data detection is performed on the selected equalized output to yield a detected output (block 535). The detected output is then stored to a central memory (block 540).

Turing to FIG. 3b and following flow diagram 345 it is determined whether a decoder circuit is available to process a previously stored the detected output (block 501). Where the decoder circuit is available (block 501), the next derivative of a detected output is selected for processing and accessed from the central memory circuit (block 506). A first local iteration of a data decoding algorithm is applied by the data decoder circuit to the selected detected output to yield a decoded output (block 511). In some embodiments of the present invention, the data decoding algorithm is a low density parity check algorithm.

It is then determined whether the decoded output converged (i.e., yielded a correct result) (block 516). Where the decoded output converged (block 516), the decoded output is provided to a hard decision output buffer (block 521). It is then determined whether the hard decision output buffer is ready to be unloaded (block 556). In some cases, the hard decision output buffer is ready to be unloaded when the most recently completed decoded output is the next decoded output after that previously provided as a data output. Where the hard decision output buffer is ready to be unloaded (block 556), all of the continuous decoded outputs maintained in the hard decision output buffer are provided as a data output to a recipient device (block 561). Based upon the disclosure provided herein, one of ordinary skill in the art will recognize a variety of recipient devices that may be used in relation to different embodiments of the present invention.

Alternatively, where the decoded output failed to converge (block 516), it is determined whether the local iteration count has exceeded a local iteration limit (block 526). This local iteration limit may be, for example, ten local iterations. Where the number of local iterations has not yet been exceeded (block 526), the data decoding algorithm is re-applied to the currently processing data set for a subsequent local iteration guided by the decoded output to yield an updated decoded output (block 531). The processes beginning at block 516 are then repeated.

Alternatively, where the number of local iterations for the currently proceeding global iteration have been exceeded (block 526), it is determined if the maximum number of global iterations have already been applied to the currently processing data set (block 536). The number of global iterations may be complete where, for example, a timeout condition has occurred or a memory usage limitation has been exceeded. Where the global iterations are not complete (block 536), it is determined whether the sync mark is unreliable, the fragment size is greater than the erasure correction power of the data decoder circuit, a defined number of global iterations has been exceeded, and there are other codewords or data sets in the input buffer that are awaiting processing (block 591). Where the conditions are not met (block 591), the decoded output is stored to the central memory where it awaits use in guiding application of the data detection algorithm during a subsequent global iteration (block 541).

Alternatively, where the conditions are met (block 591) or where the maximum number of global iterations have passed (block 536), an error is indicated (block 546) and it is determined whether another framing of the received data set is possible (block 581). Another framing is possible where another possible sync mark was detected in addition to the sync mark that was used for the original framing and the currently proceeding data processing. Where another framing is possible (block 581), the next framing is selected (block 586) and processing (i.e., the processes of FIGS. 5a-5b) is restarted using the next best sync mark to apply framing.

Figure 6:
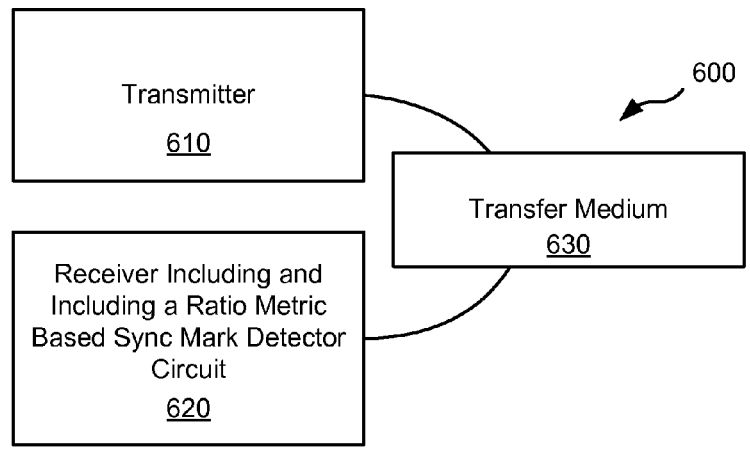
FIG. 6 depicts a communication system including a ratio metric based sync mark detector circuit in accordance with different embodiments of the present invention.

Turning to FIG. 6, a communication system 600 including a receiver 620 with a ratio metric based sync mark detector circuit is shown in accordance with different embodiments of the present invention. Communication system 600 includes a transmitter 610 that is operable to transmit encoded information via a transfer medium 630 as is known in the art. The encoded data is received from transfer medium 630 by receiver 620. The ratio metric based sync mark detector circuit included in receiver 620 may be similar to that discussed above in relation to FIGS. 2a-2c, and/or may operate in accordance with the method discussed above in relation to FIGS. 3a-3b. In some cases, the ratio metric based sync mark detector circuit is incorporated in a data processing circuit that itself is included in receiver 620. In such cases, the data processing circuit may operate in accordance with the method discussed above in relation to FIGS. 5a-5b.

Figure 7:
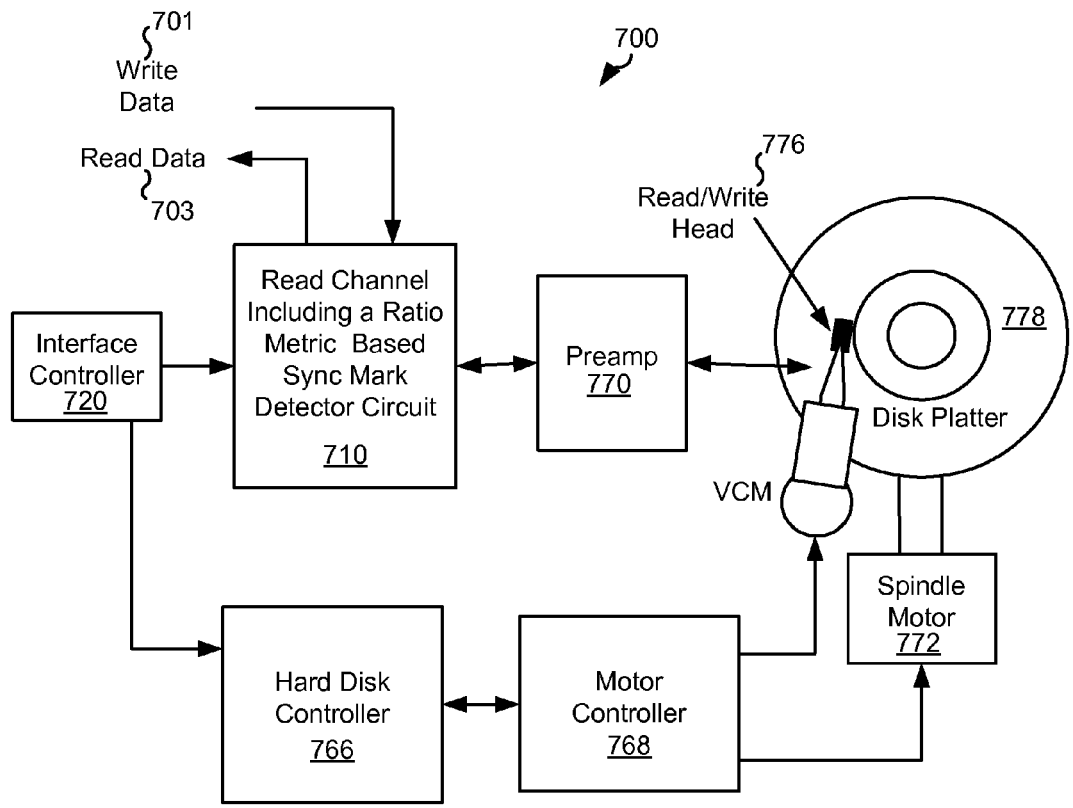
FIG. 7 shows a storage system including a ratio metric based sync mark detector circuit in accordance with some embodiments of the present invention.

Turning to FIG. 7, a storage system 700 including a read channel circuit 710 with a ratio metric based sync mark detector circuit is shown in accordance with various embodiments of the present invention. Storage system 700 may be, for example, a hard disk drive. Storage system 700 also includes a preamplifier 770, an interface controller 720, a hard disk controller 766, a motor controller 768, a spindle motor 772, a disk platter 778, and a read/write head 776. Interface controller 720 controls addressing and timing of data to/from disk platter 778. The data on disk platter 778 consists of groups of magnetic signals that may be detected by read/write head assembly 776 when the assembly is properly positioned over disk platter 778. In one embodiment, disk platter 778 includes magnetic signals recorded in accordance with either a longitudinal or a perpendicular recording scheme.

In a typical read operation, read/write head assembly 776 is accurately positioned by motor controller 768 over a desired data track on disk platter 778. Motor controller 768 both positions read/write head assembly 776 in relation to disk platter 778 and drives spindle motor 772 by moving read/write head assembly to the proper data track on disk platter 778 under the direction of hard disk controller 766. Spindle motor 772 spins disk platter 778 at a determined spin rate (RPMs). Once read/write head assembly 778 is positioned adjacent the proper data track, magnetic signals representing data on disk platter 778 are sensed by read/write head assembly 776 as disk platter 778 is rotated by spindle motor 772. The sensed magnetic signals are provided as a continuous, minute analog signal representative of the magnetic data on disk platter 778. This minute analog signal is transferred from read/write head assembly 776 to read channel module 764 via preamplifier 770. Preamplifier 770 is operable to amplify the minute analog signals accessed from disk platter 778. In turn, read channel circuit 710 decodes and digitizes the received analog signal to recreate the information originally written to disk platter 778. This data is provided as read data 703 to a receiving circuit. As part of decoding the received information, read channel circuit 710 performs a sync mark detection process. Such a sync mark detection process may be performed using a ratio metric based sync mark detector circuit included in read channel circuit 710 may be similar to that discussed above in relation to FIGS. 2a-2c, and/or may operate in accordance with the method discussed above in relation to FIGS. 3a-3b. In some cases, the ratio metric based sync mark detector circuit is incorporated in a data processing circuit that itself is included in read channel circuit 710. In such cases, the data processing circuit may operate in accordance with the method discussed above in relation to FIGS. 5a-5b.

It should be noted that storage system 700 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 700, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 710 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the system comprising:
a metric calculation circuit operable to provide at least a first comparison value corresponding to a comparison between a received input data set and a sync mark pattern, and a second comparison value corresponding to a comparison between the received input data set and a subset of the sync mark pattern and a subset of a preamble pattern;
a metric ratio calculation circuit operable to calculate a first ratio of the first comparison value and the second comparison value, and a second ratio of the second comparison value and the third comparison value; and
a sync mark found circuit operable to compare the first ratio with the second ratio, and to assert a sync found signal based at least in part on the result of the comparison of the first ratio with the second ratio.

2. The system of claim 1, wherein the system is implemented as part of an integrated circuit.

3. The system of claim 1, wherein the system is implemented as part of a device selected from a group consisting of: a storage device and a wireless communication device.

4. The system of claim 1, wherein the sync mark pattern is M bits in length, wherein the subset of the sync mark pattern is N bits in length, and wherein the subset of the preamble pattern is M-N bits in length.

5. The system of claim 4, wherein M is twenty, and wherein N is selected from a group consisting of: four, eight, twelve and sixteen.

6. The system of claim 4, wherein the sync mark pattern match calculation circuit is operable to process Y bits at a time, and wherein the subset of the sync mark pattern is selected from a group consisting of: the 4Y most significant bits of the sync mark pattern, the 3Y most significant bits of the sync mark pattern, the 2Y most significant bits of the sync mark pattern, and the Y most significant bits of the sync mark pattern.

7. The system of claim 4, wherein M is twenty, and wherein the subset of the sync mark pattern is selected from a group consisting of: the sixteen most significant bits of the sync mark pattern, the twelve most significant bits of the sync mark pattern, the eight most significant bits of the sync mark pattern, and the four most significant bits of the sync mark pattern.

8. The system of claim 1, wherein the subset of the preamble pattern is a repeating portion of the preamble pattern.

9. The system of claim 1, wherein the sync mark pattern is twenty bits in length, wherein the subset of the sync mark pattern is a first subset of the sync mark pattern, wherein the subset of the preamble pattern is a first subset of the preamble pattern, wherein the sync mark pattern match calculation circuit is further operable to:
provide a third comparison value corresponding to a comparison between the received input data set and a third subset of the sync mark pattern and a third subset of a preamble pattern;
provide a fourth comparison value corresponding to a comparison between the received input data set and a fourth subset of the sync mark pattern and a fourth subset of a preamble pattern; and
provide a fifth comparison value corresponding to a comparison between the received input data set and a fifth subset of the sync mark pattern and a fifth subset of a preamble pattern.

10. The system of claim 1, wherein the system further comprises:
- a buffer operable to store a first location corresponding to the first ratio and a second location corresponding to the second ratio, wherein one of the first location and the second location is used to frame a user data set for data processing.

11. The system of claim 1, wherein the system further comprises:
- a data detector circuit operable to apply a data detection algorithm to a portion of the received input data framed using the sync found signal to yield a detected output; and
- a data decoder circuit operable to apply a data decoding algorithm to the detected output to yield a decoded output.

12. The system of claim 11, wherein the sync found signal is a first sync found signal, wherein the portion of the received input data is a first portion of the received input data; wherein the detected output is a first detected output, wherein the decoded output is a first decoded output, wherein the system further comprises:
- a buffer operable to store a first location corresponding to the first ratio and a second location corresponding to the second ratio, wherein the sync found signal initially indicates the first location;
- wherein the data detector circuit is further operable to apply the data detection algorithm to a second portion of the received input data framed using a second sync found signal corresponding to the second location to yield a second detected output; and
- wherein the data decoder circuit is further operable to apply the data decoding algorithm to the second detected output to yield a second decoded output.

13. The system of claim 11, wherein the data detection algorithm is selected from a group consisting of: a Viterbi algorithm data detection algorithm, and a maximum a posteriori data detection algorithm.

14. The system of claim 11, wherein the data decoding algorithm is a low density parity check algorithm.

15. A method for detecting a data pattern, the method comprising:
- receiving an input data set;
- comparing the input data set with a first portion of a sync mark pattern to yield a first comparison value using a comparing circuit;
- comparing the input data set with a second portion of the sync mark pattern to yield a second comparison value;
- comparing the input data set with a preamble pattern to yield a third comparison value;
- summing at least the first comparison value and the second comparison value to yield a first result;
- summing at least the second comparison value and the third comparison value to yield a second result;
- calculating a first ratio of the first result relative to the second result;
- calculating a second ratio of the second result relative to the first result; and
- asserting a sync found signal based upon the first ratio relative to the second ratio.

16. The method of claim 15, wherein the method further comprises:
- applying a data detection algorithm by a data detector circuit to a portion of the input data set to yield a detected output; and
- applying a data decoding algorithm to the detected output by a data decoder circuit to yield a decoded output.

17. The method of claim 16, wherein the sync found signal is a first sync found signal, wherein the portion of the input data set is a first portion of the input data set;
- wherein the detected output is a first detected output, wherein the decoded output is a first decoded output, wherein the method further comprises:
- storing a first location corresponding to the first ratio and a second location corresponding to the second ratio;
- applying the data detection algorithm to a second portion of the input data set framed using a second sync found signal corresponding to the second location to yield a second detected output; and
- applying the data decoding algorithm to the second detected output to yield a second decoded output.

18. The method of claim 17, wherein applying the data detection algorithm to a second portion of the input data set framed using a second sync found signal is done only if the first decoded output fails to converge.

19. The method of claim 15, wherein the subset of the preamble pattern is a repeating portion of the preamble pattern.

20. A storage device, the storage device comprising:
- a storage medium;
- a head assembly disposed in relation to the storage medium and operable to provide a sensed signal corresponding to information on the storage medium;
- a read channel circuit including:
  - an analog front end circuit operable to provide an analog signal corresponding to the sensed signal;
  - an analog to digital converter circuit operable to sample the analog signal to yield a series of digital samples;
  - an equalizer circuit operable to equalize the digital samples to yield a sample set;
  - a data processing circuit, wherein the data processing circuit includes:
    - a metric calculation circuit operable to provide at least a first comparison value corresponding to a comparison between the sample set and a sync mark pattern, and a second comparison value corresponding to a comparison between the sample set and a subset of the sync mark pattern and a subset of a preamble pattern;
    - a metric ratio calculation circuit operable to calculate a first ratio of the first comparison value and the second comparison value, and a second ratio of the second comparison value and the third comparison value; and
    - a sync mark found circuit operable to compare the first ratio with the second ratio, and to assert a sync found signal based at least in part on the result of the comparison of the first ratio with the second ratio.

* * * * *